United States Patent [19]
Eucker

[11] 3,858,992

[45] Jan. 7, 1975

[54] STRAIN RELIEF COUPLING

[75] Inventor: Robert A. Eucker, Brooklyn, Ohio

[73] Assignee: Preformed Line Products Company, Cleveland, Ohio

[22] Filed: Nov. 19, 1973

[21] Appl. No.: 417,043

Related U.S. Application Data

[63] Continuation of Ser. No. 187,305, Oct. 7, 1971, abandoned.

[52] U.S. Cl................... 403/214, 29/461, 174/79, 174/DIG. 12, 403/275
[51] Int. Cl............................................... F16b 7/02
[58] Field of Search........... 24/123 C, 130 C, 123 F, 24/123 B; 174/DIG. 12, 79; 29/461, 460, 29/423, 419; 403/206, 275, 214

[56] References Cited
UNITED STATES PATENTS

| | | | |
|---|---|---|---|
| 656,187 | 8/1900 | Gunnell | 285/149 |
| 2,016,856 | 10/1935 | Fiege | 24/126 |
| 3,007,243 | 11/1961 | Peterson | 29/419 |
| 3,561,071 | 2/1971 | Schlein | 24/123 |
| 3,573,346 | 4/1971 | Appleby | 174/71 |
| 3,786,554 | 1/1974 | Little | 29/461 |

FOREIGN PATENTS OR APPLICATIONS

| | | | |
|---|---|---|---|
| 429,572 | 5/1935 | Great Britain | 403/206 |

*Primary Examiner*—Jordan Franklin
*Assistant Examiner*—Wayne L. Shedd
*Attorney, Agent, or Firm*—Hume, Clement, Brinks, Willian, Olds & Cook, Ltd.

[57] ABSTRACT

Preassembled appliances for linear bodies and methods of preassembly are disclosed. An egg-shaped protuberance is applied about an elongated form of a configuration simulating that of the linear body, the form being arranged for release from the assembled appliance. Helically preformed rods are next wrapped about the form and the protuberance. Preferably, the rods extend only a short distance to one side of the protuberance and a much greater distance in the opposite direction. The short extension of rods is embedded in epoxy to complete a subassembly wherein the epoxy embedded rods maintain their enlarged helix diameter following removal of the form therefrom. The subassembly is installed in an elongated housing with the longer extension of rods projecting through a narrow diameter aperture in one housing end portion and with the protuberance seating against the contoured interior sidewalls of the housing. A closure member is installed in an opposite receiving end of the housing to secure the subassembly in place. The helical rods extending out the open end of the housing are unwrapped from the form and the form is withdrawn from the assembly. The appliance is now in a preassembled condition ready for installation on a linear body in the intended environment of use. Other method features and apparatus are disclosed.

21 Claims, 7 Drawing Figures

FIG. 3A
FIG. 3B
FIG. 3E
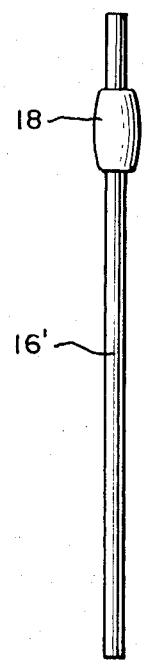
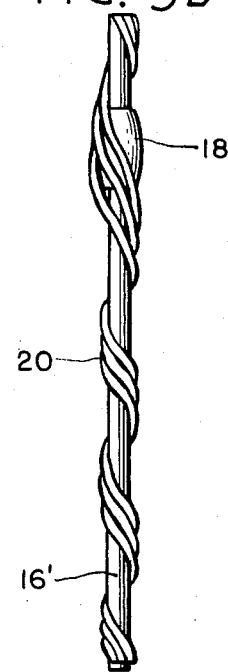
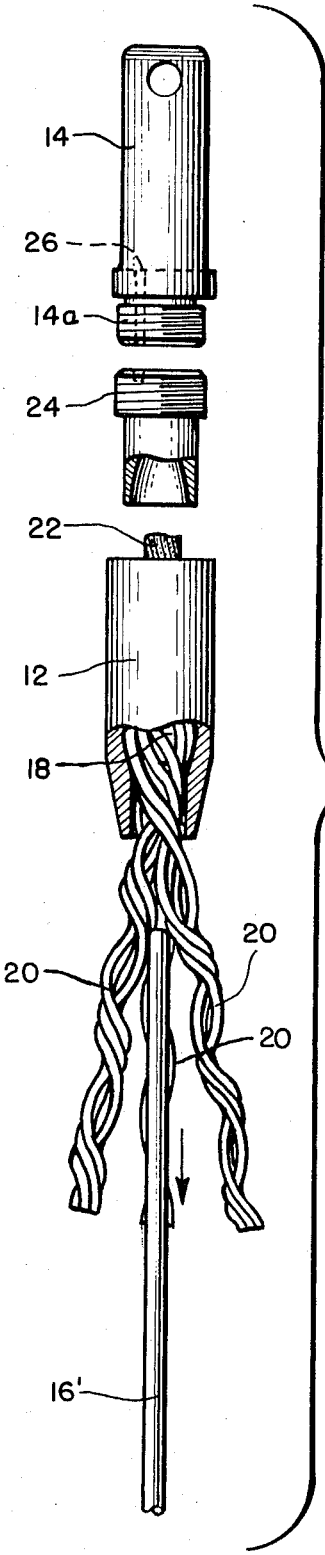
FIG. 3C
FIG. 3D
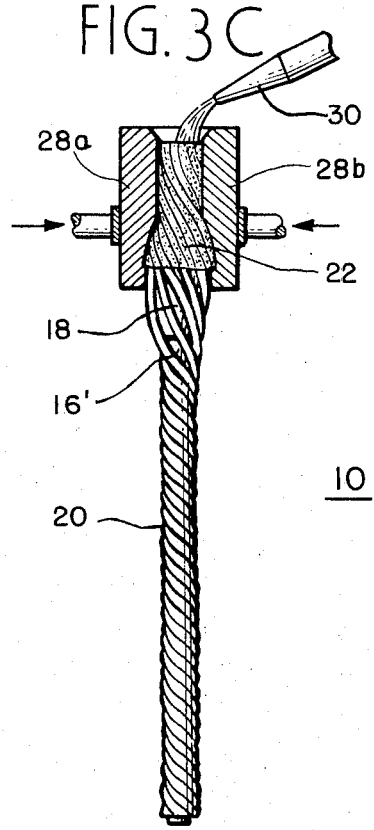
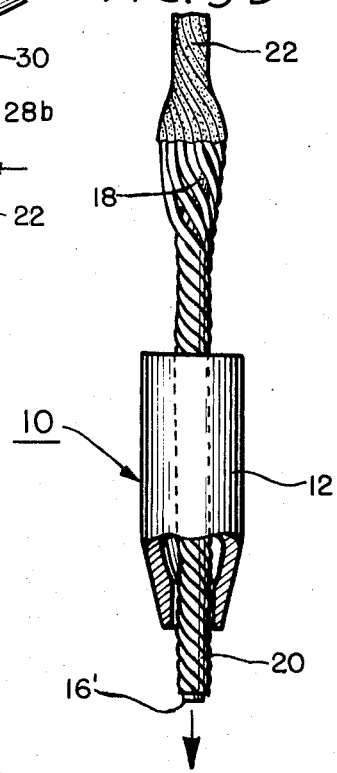

STRAIN RELIEF COUPLING

CROSS REFERENCE TO RELATED APPLICATION

The present application is a continuation of application Ser. No. 187,305, filed Oct. 7, 1971 now abandoned, and assigned to the same assignee as the present invention.

INTRODUCTION

The present invention relates generally to appliances for linear bodies and, more particularly, is directed to methods of preassembly of such appliances as well as the structure of the preassembled appliances per se. The invention is of particular utility in connection with preassembly of appliances of the type disclosed and claimed in U.S. Pat. No. 3,573,346, assigned to the same assignee as the present invention, although those skilled in the art will recognize that the invention is equally suitable for application in other contexts.

SUMMARY OF THE INVENTION

It is an objective of the present invention to provide preassembled appliances for application to linear bodies thereby substantially simplifying and shortening the on site installation procedure. In accordance with the invention, the burdens on the installer, such as cramped working quarters and unfavorable climatic conditions are minimized by the modest demands of final assembly. Also, an epoxy type potting compound is used in a preferred embodiment of the invention and the typically long curing time previously required as part of the final assembly procedure is obviated by the preassembly procedure of the invention.

The multiple components of the appliance are preassembled at the factory insuring standardization of assembly procedure. Tools and techniques not readily adaptable to field use may effectively be utilized in the factory to provide a production line manufacture of the appliance. The appliances may thoroughly be tested avoiding failures that might otherwise occur in the field.

A further feature of the invention is that the preassembled structure is conveniently disassembled and is reusable in other installations without disposal of any of the appliance components. The preassembly methods themselves are also rather simple and economical and the benefits of preassembly carry over to reuse.

According to one facet of the invention, a method of preassembling an appliance for a linear body comprises applying a protuberance member about an elongated form of a configuration simulating that of the linear body, the form being arranged for release from the appliance following assembly. Helically preformed rods of a predetermined pitch length and of an internal diameter smaller than that of the linear body are wrapped about the form and protuberance so that the rod means extend over the protuberance and in tightly gripping relation with the protuberance and form. The rod means are secured to the protuberance and preferably the rod means extending in a first direction from the protuberance are fixed (by encasement in an epoxy type potting compound or the like) at an internal diameter corresponding to that of the form so that the rods maintain such diameter even after withdrawal of the form therefrom. The preformed helical rods extending in the other direction from the protuberance are unwrapped and the form is released from the appliance by withdrawing same from the protuberance and helical rods to complete the preassembly procedure.

Various other aspects of the methods of the invention as well as the structure of the preassembled appliance are defined in the specification and claims.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGURES of which like reference numerals identify like elements and in which:

FIGS. 3A–3E are semi-schematic illustrations depicting the method steps involved in preassembling the appliance of FIGS. 1 and 2.

DESCRIPTION OF THE PREFERRED EMBODIMENTS

Figure 1:
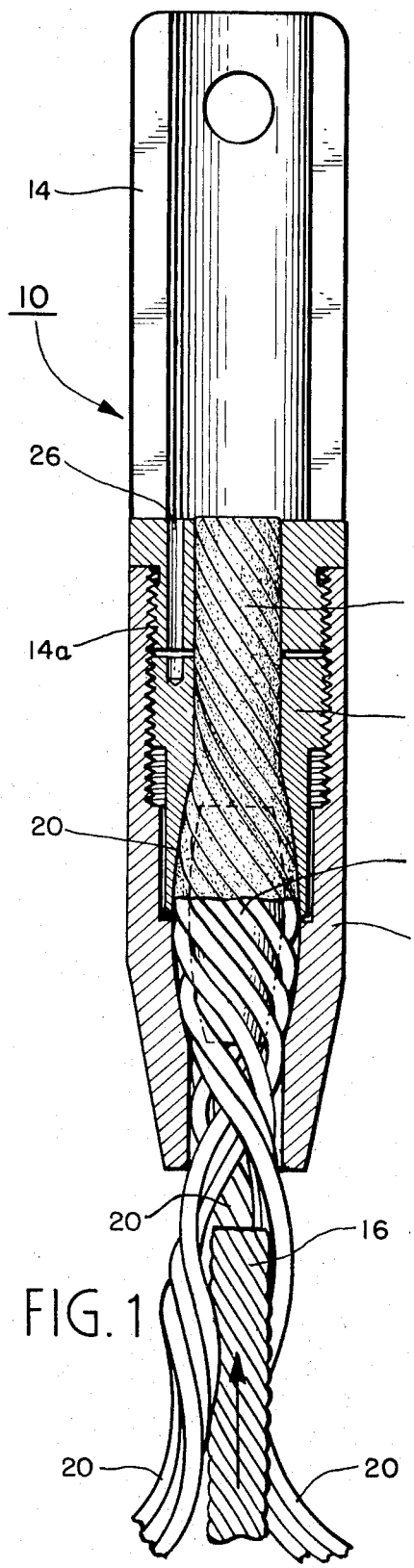
FIG. 1 is a sectional view of a preassembled appliance of the present invention.
Figure 2:
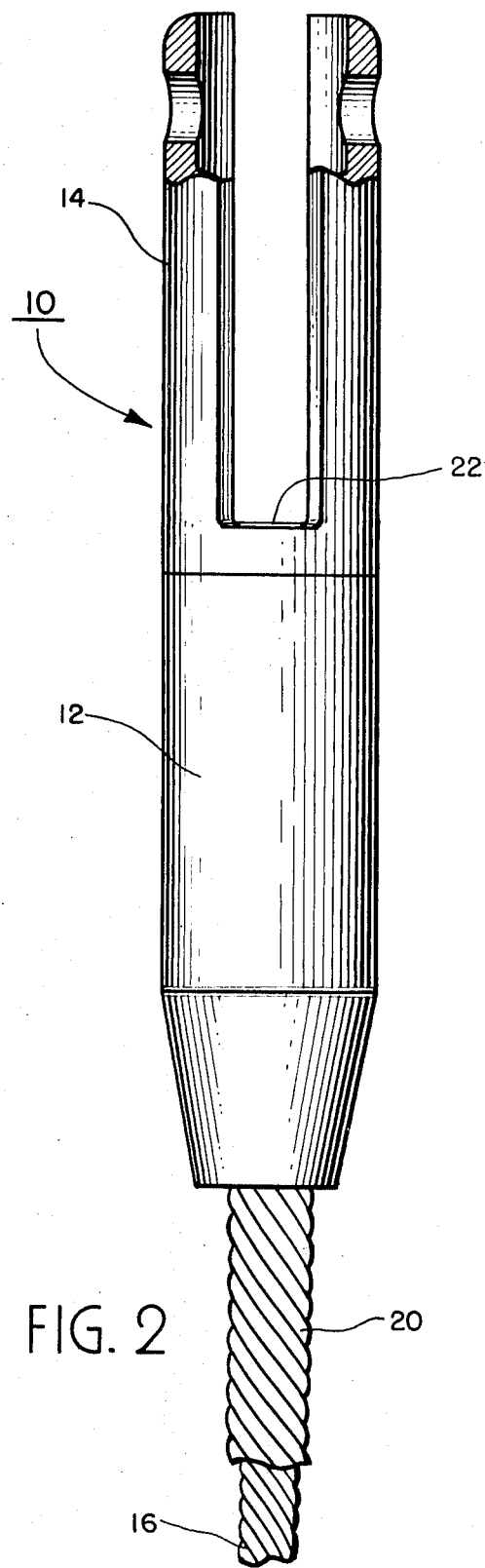
FIG. 2 is a side elevational view of the appliance of FIG. 1 as installed in a linear body.

Referring now to FIGS. 1 and 2, the appliance 10 there shown is in the form of a strain relief coupling which, except for the preassembly features of the present invention, is of a construction generally similar to that disclosed and claimed in the earlier mentioned U.S. Pat. No. 3,573,346. It will be recognized by those skilled in the art that the preassembly methods and the structure of the present invention are of utility in connection with various types of appliances in addition to those disclosed and claimed in the aforementioned patent.

The strain relief coupling 10 comprises an elongated, hollow housing means 12 having an upper or receiving end portion secured to a connector fitting in the form of a clevis 14. The clevis 14 includes at its lower end a centrally apertured cylindrical plug 14a which is threadably secured in the receiving end of the housing 12. The clevis 14 provides a means for effecting a mechanical connection between the coupling 10 and an oceanographic instrumentation buoy or the like (not shown).

The coupling 10 is illustrated in FIG. 1 in its fully preassembled condition. A cable 16 is shown axially aligned with the central opening in the lower end of the housing 12 preliminary to insertion therein and securance to the coupling 10. The coupling 10 includes a protuberance means 18 preferably in the form of an ellipsoidal or egg-shaped bump situated in the lower end of the housing 12 and having a central bore disposed coaxially with the opening in the lower end of the housing 12. It will be recognized by those skilled in the art that protuberance 18 may be of a different contour such as a cylinder or a tapered wedge.

Preformed helical rod means 20 of a predetermined pitch length and of a nominal internal diameter smaller than that of the cable 16 are wrapped about the protuberance 18 and extend in opposite directions therefrom. The ellipsoidal or egg-shaped contour of bump 18 accommodates the wrapping of the helical rods thereabout. The subassembly of the protuberance and helical rods seats within the lower end of the housing 12 against the complementary contour of the internal sidewalls of the housing. The opening in the lower end of the housing 12 is of a diameter intermediate the maximum diameter of the subassembly 18, 20 and the cable 16 so as to comfortably accommodate the cable 16 and to permit unimpeded wrapping of the rods 20 thereabout during the final assembly procedure, as will presently be explained. The central bore of bump 18 is of a diameter for easily passing the cable 16.

The preformed helical rods 20 extending below the housing 12 in FIG. 1 are illustrated in an unwrapped condition but are adapted for wrapping about the cable 16 in a tightly gripping relation therewith following insertion of the cable into the coupling, as shown in FIG. 2. Once wrapped about the cable 16, the helical rods 20 preclude relative movement therebetween. The forces developed between the cable 16 and the rods 20 under operational conditions are transferred to the housing 12 through the subassembly 18, 20.

The rods 20 are precluded from being drawn over the bump 18 and out of the housing 12 under even extreme forces by virtue of retaining means which secures the rods 20 against movement relative to the protuberance 18. In the present embodiment, the retaining means comprises a continuation of the helical rods 20 for a predetermined distance beyond the upper end of the protuberance 18. In order that this rearward extension of the rods 20 will freely pass the cable 16 during final assembly, this portion of the rods during preassembly is expanded to an enlarged internal diameter and is fixed at such diameter by encasement in an epoxy type potting compound 22 or the like. Although in the description and claims that follow the material 22 is referred to as an epoxy type potting compound, it will be recognized by those skilled in the art that any functionally equivalent material may be substituted.

Preferably, the potting compound 22 or the like is applied at a point commencing about midway along the longitudinal extent of the protuberance 18 and continues to the rearward most extent of the helical rods. The forward portion of the subassembly 18, 20 is not covered with epoxy to permit a direct metal to metal contact between the rods 20 and the contoured interior surface of the housing 12. The forward portion of the protuberance may, however, be embedded in a relatively soft or resilient material such as neoprene or polyurethane to alleviate chaffing and abrasion while still affording the desired contact between the housing and protuberance. It will also be recognized that a somewhat greater or lesser portion than one-half of the protuberance 18 may be embedded in the epoxy type potting compound 22, if desired. Alternatively, the potting compound 22 as well as the rearward extension of the helical rods 20 beyond the protuberance 18 may be omitted and the rods 20 securely welded or brazed to the protuberance 18. As a further alternative, the rods 20 may be swaged in helical slots on the circumference of the protuberance 18 and a cylindrical rearward extension of the protuberance (not shown) may be provided for aiding in the securance of the rearward extension of the rods 20. It is necessary only that the rods 20 be securely retained against movement relative to the bump 18 and those skilled in the art will recognize other structural alternatives to achieving that end.

It is also desirable to securely locate the subassembly 18, 20 within the housing 12. To this end, there is provided a contoured closure plug 24 that is threadably received in the upper end of the housing 12. The lower end of the plug 24 includes a hollow receiving portion of a contour complementary to the rearward half-section of the protuberance 18. Thus, the forward half of the protuberance seats in the contoured nose of the housing 12 while the back half is confined in the contoured recess of the plug 24.

Tightening of the closure plug 24 into engagement with the back half of protuberance 18, is facilitated by means of a pair of Allen keys 26, only one of which is visible in the drawing. Specifically, the Allen keys 26 extend through respective bores in the cylindrical base of the clevis 14 into coaxially aligned receiving bores in the closure plug 24 to effect an interlock of the members 14 and 24. Thus, rotation of the clevis 14 by means of a spanner wrench or the like effects a tightening of the closure plug 24.

As previously mentioned, the strain relief coupling 10 may be entirely preassembled at the factory. Final on site installation is accomplished by inserting the cable 16 into the lower end of the housing 12 and through the coaxially aligned central passages of the protuberance 18 and the rearward extension of the enlarged diameter helical rods 20. Any length of cable 16 may be drawn through the coupling 10 as may be required for the particular application. When the coupling 10 is suitably positioned on the cable 16, the helical rods 20 are wrapped about the cable 16 in conventional fashion, as shown in FIG. 2. The installation is now complete. By means of the bump 18, the armor rods 20 and the housing 12, stress forces on the cable 16 are translated to the housing 12 and thence to the clevis 14 and attached support (not shown).

Referring now sequentially to FIGS. 3A–3E the structure and methods of preassembling the strain relief coupling of the invention may be understood in further detail. Specifically, as shown in FIG. 3A, the ellipsoidal bump 18 is slidably inserted over a form 16'. Of course, bump 18 may be composed of a pair of half-sections applied about the cable from opposite sides.

The form 16' is of a convenient length for use in preassembly and is of a diameter simulating that of a cable about which the coupling is utimately to be applied. As will be explained, the form 16' is withdrawn from the appliance following preassembly. To facilitate this objective, the form 16 is coated with a conventional mold release compound or, alternatively, it is constructed so as to be collapsible. At any rate, with the protuberance 18 appropriately positioned on the form 16', the helical armor rods 20 are applied about the protuberance and form in the manner illustrated in FIG. 3B.

The methods and means for forming such protuberances on cables are known to the art and are disclosed and claimed, for example, in U.S. Pat. No. 3,007,243 – Peterson, assigned to the same assignee as the present invention. Following application of the helical elements 20 about the protuberance 18 and the form 16', the subassembly is in condition for encasement in the epoxy potting compound. To this end, and as represented schematically in FIG. 3C, a pair of identical mold half-sections 28a, 28b are applied about the protuberance. The epoxy potting compound is poured from a container 30 or otherwise suitably introduced into the cavity between the closed mold 28a, 28b and the subassembly of the helical rods 20 and the bump 18. Alternatively, the member 24 may be used as the mold for forming the epoxy about the subassembly 18, 20. This method assures an intimate fit between the member 24 and the coated subassembly 18, 20.

After the epoxy has suitably cured, for example, in about twenty hours, the subassembly is removed from the mold and is ready for installation in the housing 12. In FIG. 3D, the subassembly is shown being lowered into the housing 12 through the open receiving end of the housing. It will be noted that the form 16' is still contained within the subassembly; however, if desired, the form may be removed prior to installation of the subassembly in housing 12. Also, the step of the epoxy coating of the subassembly may take place after installation of the subassembly in housing 12. However, in this latter event the form may not be removed until after the epoxy compound has set.

At any rate, the appliance assembly is completed by merely slipping the closure plug 24 and the centrally aperture clevis 14 over the upper end portion of the epoxy coated helical rods 20. The closure plug 24 and the clevis 14 are threadably secured to the housing 12, the closure plug 24 being tightened down into place by means of its interconnection to the cylindrical base of the clevis 14 through the Allen keys 26 (FIG. 1). The portion of the helical rods 20 extending below the nose of the housing 12 are next unwrapped (if this step has not previously been done) and the form 16' is withdrawn, as indicated by the arrow adjacent form 16' in FIG. 3E. It will, of course, be recalled that the portion of rods 20 extending rearwardly of protuberance 18 are retained at an enlarged diameter for passing a cable 16 by reason of their embedment in the epoxy 22. The preassembled coupling 10 is now in condition for shipment to the installation site.

While particular embodiments of the present invention have been shown and described, it is apparent that various changes and modifications may be made, and it is therefore intended in the following claims to cover all such modifications and changes as may fall within the true spirit and scope of this invention.

The embodiments of the invention in which an exclusive property or privilege is claimed are defined as follows:

1. A method of preassembling an appliance for a linear body, comprising:
    applying a protuberance member about an elongated form of a configuration simulating said linear body and arranged for release from said appliance following assembly;
    wrapping preformed helical rod means of a predetermined pitch length and of an internal diameter smaller than that of said linear body about said form and protuberance so that said rod means extend over said protuberance and in tightly gripping relation with said form;
    securing said rod means to said protuberance to form an integral appliance assembly;
    unwrapping said preformed helical rod means extending in at least one direction from said protuberance; and
    releasing said form from said appliance by withdrawing said form from said protuberance and said helical rods.

2. The method of claim 1 in which said rod means extend along said form in a direction opposite to said one direction and including the step of fixing said rod means extending in said opposite direction at an internal diameter corresponding to that of said form so that said rod means extending in said opposite direction retains an internal diameter equal to the diameter of said form upon withdrawal of said form therefrom.

3. The method of claim 2 in which said helical rod means is comprised of a plurality of individual strands and in which said fixing step includes securing said strands together.

4. The method of claim 3 in which said fixing step comprises applying an epoxy type potting compound about at least a portion of said protuberance and about at least a portion of said helical rod means extending in said opposite direction.

5. The method of claim 4 in which said epoxy type potting compound is applied by placing a mold about said protuberance and said rod means extending in said opposite direction and pouring said epoxy type potting compound into said mold.

6. The method of claim 5 in which said form is a rod member lubricated with a mold release compound and in which said unwrapping step precedes the step of releasing said form.

7. A method of preassembling an appliance for a linear body comprising:
    applying a protuberance member about an elongated form of a configuration simulating said linear body and arranged for release from said appliance following assembly;
    wrapping preformed helical rod means of a predetermined pitch length and of an internal diameter smaller than that of said linear body about said form and protuberance so that said rod means extend over said protuberance and in tightly gripping relation with said form;
    securing said rod means to said protuberance to form a subassembly;
    installing said subassembly in an elongated housing member having an open end for receiving said subassembly and with interior sidewalls tapering toward an opposite end of a narrowed diameter for passing an end portion of said subassembly to one side of said protuberance and with said protuberance seating against said tapered interior sidewalls of said housing;
    installing closure means in said open end of said housing member to form an integral appliance assembly;
    unwrapping that portion of said preformed helical rod means extending in said one direction from said protuberance; and
    releasing said form from said appliance by withdrawing said form from said protuberance and said helical rods.

8. The method of claim 7 in which said rod means extend along said form in a direction opposite to said one direction and including the step of fixing said rod means extending in said opposite direction at an internal diameter corresponding to that of said form so that said rod means extending in said opposite direction retains an internal diameter equal to the diameter of said form upon withdrawal of said form therefrom.

9. The method of claim 8 in which said helical rod means is comprised of a plurality of individual strands and in which said fixing step includes securing said strands together.

10. The method of claim 9 in which said fixing step comprises applying an epoxy type potting compound about at least a portion of said protuberance and about at least a portion of said helical rod means extending in said opposite direction.

11. The method of claim 10 in which said epoxy type potting compound is applied by placing a mold about said protuberance and said rod means extending in said opposite direction and pouring said epoxy type potting compound into said mold.

12. The method of claim 11 in which said form is a rod member lubricated with a mold release compound and in which said unwrapping step precedes the step of releasing said form.

13. The method of claim 8 in which said securing and fixing steps occur after installation of said subassembly in said housing and comprise pouring an epoxy type potting compound into the open end of said housing.

14. The method of claim 11 in which said mold surrounds the entirety of said protuberance and the full length of the helical rods extending in said opposite direction for covering a corresponding portion of said subassembly with said epoxy type potting compound.

15. The method of claim 11 in which said mold surrounds the full length of the helical rods extending in said opposite direction and a contiguous half-portion of said protuberance for covering a corresponding portion of said subassembly with said epoxy type potting compound.

16. A preassembled appliance for application to a linear body comprising:
   protuberance means have a central bore of a diameter for passing said linear body and having an enlarged body portion of a predetermined diameter;
   preformed helical rod means of a predetermined pitch length, said rod means being wrapped about said protuberance means and extending in one direction from said protuberance means in an unwrapped condition but adapted for wrapping about said linear body in tightly gripping relation therewith and extending in an opposite direction in a wrapped condition;
   retaining means for fixedly forming said oppositely extending portion of said resilient rod means at a preselected internal diameter intermediate that of said body portion and said linear body for securing said rod means against sliding movement over said protuberance means while permitting free passage of said linear body therethrough;
   housing means including an open end of a dimension for receiving said protuberance means, a hollow interior body portion seating said protuberance means and further having an aperture opposite said open end and coaxially aligned with the bore in said protuberance means and of a diameter intermediate that of said protuberance means and the exterior diameter of said helical rods when wrapped about said linear body for passing said unwrapped end portion of said helical appliance; and
   closure means received in the open end of said housing means for securing the assembly of said protuberance means, rod means and retaining means within said housing in condition for assembly on said linear body.

17. The preassembled appliance of claim 16 in which said protuberance is ellipsoidal in contour and in which said housing is of a contour complementary to the half-section of said ellipsoidal protuberance means extending in said one direction and in which said closure means includes a first member of a contour complementary to the half-section of said protuberance means extending in said opposite direction.

18. The preassembled appliance of claim 17 in which said member of said closure means includes a central bore coaxially aligned with the bore of said protuberance means for passing said enlarged diameter portion of said helical rod means.

19. The preassembled appliance of claim 18 in which said retaining means comprises an epoxy type potting compound molded about at least said enlarged diameter portion of said helical rod means and the contiguous half-section of said protuberance means.

20. The preassembled appliance of claim 19 in which said closure means includes a second member threadably received in the open end of said housing means.

21. The preassembled appliance of claim 20 in which said housing means includes a clevis portion.

* * * * *